(12) United States Patent
McKinnon et al.

(10) Patent No.: US 7,711,810 B2
(45) Date of Patent: *May 4, 2010

(54) DISTRIBUTED SERVICES BASED ON PRESENCE TECHNOLOGY

(75) Inventors: Steve J. McKinnon, Cary, NC (US); William Janning, Allen, TX (US); Douglas S. Weisenberg, Cary, NC (US)

(73) Assignee: Nortel Networks Limited, St. Laurent, Quebec (CA)

( * ) Notice: Subject to any disclaimer, the term of this patent is extended or adjusted under 35 U.S.C. 154(b) by 1090 days.

This patent is subject to a terminal disclaimer.

(21) Appl. No.: 10/336,523

(22) Filed: Jan. 3, 2003

(65) Prior Publication Data

US 2004/0133641 A1 Jul. 8, 2004

(51) Int. Cl.
*G06F 15/173* (2006.01)
(52) U.S. Cl. ................. 709/224; 709/223; 709/227
(58) Field of Classification Search ............. 709/223, 709/224, 219, 206, 204, 205, 202, 228, 207, 709/227; 370/349, 266.02; 455/466
See application file for complete search history.

(56) References Cited

U.S. PATENT DOCUMENTS

| | | | |
|---|---|---|---|
| 4,932,050 A | 6/1990 | Davidson et al. | 379/211 |
| 5,185,782 A | 2/1993 | Srinivasan | 379/67 |
| 5,243,645 A | 9/1993 | Bissell et al. | 379/211 |
| 5,315,636 A | 5/1994 | Patel | 379/58 |
| 5,414,759 A | 5/1995 | Ishikuri et al. | 379/88 |
| 5,450,613 A | 9/1995 | Takahara et al. | 455/54.1 |
| 5,550,907 A | 8/1996 | Carlsen | 379/207 |
| 5,555,376 A | 9/1996 | Theimer et al. | 395/200.09 |
| 5,596,633 A | 1/1997 | Meier et al. | 379/201 |

(Continued)

FOREIGN PATENT DOCUMENTS

EP 1071295 A2 1/2001

(Continued)

OTHER PUBLICATIONS

Day, M. and Rosenberg, J., "Request for Comments (RFC) 2778: A Model for Presence and Instant Messaging," IETF—Network Working Group, Information Memo, Feb. 2000, XP002201444.

(Continued)

*Primary Examiner*—Le Luu
(74) *Attorney, Agent, or Firm*—Withrow & Terranova, P.L.L.C.

(57) ABSTRACT

The present invention provides distributed communication services based on a presence technology platform. Presence messaging and communication techniques allow a variety of communication agents to cooperate with one another to provide distributed services. Essentially, the messaging between the agents is used to facilitate media sessions and update participating devices of state changes bearing on providing the services. In one embodiment, each of the participating devices is associated with a logic entity, referred to as a presentity, which subscribes to notification services for the other participating devices. When a state change occurs on any one of the participating devices, the corresponding presentity notifies the other devices of the state change. As such, each participating device knows the status of the other participating devices via the presentities and can systematically determine when and how to provide services based on its current state and the current state of the other participating devices.

35 Claims, 9 Drawing Sheets

U.S. PATENT DOCUMENTS

| | | | |
|---|---|---|---|
| 5,633,921 A | 5/1997 | Soderberg | 379/207 |
| 5,633,924 A | 5/1997 | Kaish et al. | 379/266 |
| 5,742,905 A | 4/1998 | Pepe et al. | 455/461 |
| 5,757,901 A | 5/1998 | Hiroshige | 379/212 |
| 5,771,280 A | 6/1998 | Johnson | 379/93.23 |
| 5,790,649 A | 8/1998 | Hiroshige | 379/201 |
| 5,812,865 A | 9/1998 | Theimer et al. | 395/800 |
| 5,815,554 A * | 9/1998 | Burgess et al. | 379/90.01 |
| 5,825,864 A * | 10/1998 | McGraw et al. | 379/210 |
| 5,901,359 A | 5/1999 | Malmstrom | |
| 5,930,702 A * | 7/1999 | Goldman et al. | 455/417 |
| 5,960,173 A | 9/1999 | Tang et al. | |
| 6,052,597 A | 4/2000 | Ekstrom | |
| 6,058,415 A * | 5/2000 | Polcyn | 709/200 |
| 6,067,357 A | 5/2000 | Kishinsky et al. | 379/265 |
| 6,104,913 A | 8/2000 | McAllister | 455/41 |
| 6,125,176 A * | 9/2000 | Foladare et al. | 379/211 |
| 6,134,314 A | 10/2000 | Dougherty et al. | 379/207 |
| 6,141,356 A | 10/2000 | Gorman | 370/493 |
| 6,144,644 A | 11/2000 | Bajzath et al. | 370/259 |
| 6,148,328 A * | 11/2000 | Cuomo et al. | 709/204 |
| 6,175,616 B1 * | 1/2001 | Light et al. | 379/88.14 |
| 6,185,292 B1 * | 2/2001 | Miloslavsky | 379/265 |
| 6,223,165 B1 * | 4/2001 | Lauffer | 705/8 |
| 6,233,465 B1 | 5/2001 | Smith et al. | |
| 6,243,398 B1 * | 6/2001 | Kahane et al. | 370/522 |
| 6,253,230 B1 | 6/2001 | Couland et al. | |
| 6,260,148 B1 | 7/2001 | Aggarwal et al. | 713/201 |
| 6,295,348 B1 | 9/2001 | Bleile et al. | 379/199 |
| 6,301,609 B1 | 10/2001 | Aravamudan et al. | 709/207 |
| 6,330,322 B1 | 12/2001 | Foladare et al. | |
| 6,377,944 B1 | 4/2002 | Busey et al. | 707/3 |
| 6,389,127 B1 * | 5/2002 | Vardi et al. | 379/209.01 |
| 6,418,198 B2 * | 7/2002 | Brablec et al. | 379/79 |
| 6,430,289 B1 * | 8/2002 | Liffick | 379/900 |
| 6,430,395 B2 | 8/2002 | Arazi et al. | |
| 6,445,912 B1 | 9/2002 | Cole et al. | 455/406 |
| 6,449,344 B1 * | 9/2002 | Goldfinger et al. | 379/88.17 |
| 6,463,142 B1 * | 10/2002 | Kilp | 379/201.06 |
| 6,463,471 B1 * | 10/2002 | Dreke et al. | 709/224 |
| 6,480,593 B1 * | 11/2002 | Munday et al. | 379/211.02 |
| 6,483,900 B1 * | 11/2002 | Light et al. | 379/88.17 |
| 6,519,639 B1 | 2/2003 | Glasser et al. | 709/224 |
| 6,546,096 B1 | 4/2003 | Meiden et al. | 379/209.01 |
| 6,549,937 B1 | 4/2003 | Auerbach et al. | |
| 6,560,648 B1 | 5/2003 | Dunn et al. | 709/224 |
| 6,564,261 B1 | 5/2003 | Gudjonsson et al. | 709/227 |
| 6,584,494 B1 | 6/2003 | Manabe et al. | 709/204 |
| 6,617,969 B2 | 9/2003 | Tu et al. | |
| 6,618,710 B1 | 9/2003 | Zondervan et al. | |
| 6,633,636 B1 | 10/2003 | McConnell et al. | |
| 6,640,241 B1 | 10/2003 | Ozzie et al. | |
| 6,654,790 B2 | 11/2003 | Ogle et al. | |
| 6,658,095 B1 | 12/2003 | Yoakum et al. | 379/93.01 |
| 6,665,395 B1 | 12/2003 | Busey et al. | 379/265.09 |
| 6,678,719 B1 | 1/2004 | Stimmel | |
| 6,697,840 B1 | 2/2004 | Godefroid et al. | 709/205 |
| 6,700,966 B2 | 3/2004 | Takagi et al. | 379/201.06 |
| 6,728,754 B1 | 4/2004 | Lipton | |
| 6,735,701 B1 | 5/2004 | Jacobson | 713/201 |
| 6,738,461 B2 | 5/2004 | Trandal et al. | 379/142.02 |
| 6,741,853 B1 | 5/2004 | Jiang et al. | |
| 6,799,209 B1 | 9/2004 | Hayton | |
| 6,807,423 B1 | 10/2004 | Armstrong et al. | 455/440 |
| 6,810,411 B1 | 10/2004 | Coughlin et al. | 709/203 |
| 6,920,498 B1 | 7/2005 | Gourlay et al. | |
| 6,985,961 B1 | 1/2006 | Ramsayer et al. | |
| 7,020,480 B2 | 3/2006 | Coskun et al. | |
| 7,103,651 B2 | 9/2006 | Bohannon et al. | |
| 7,136,631 B1 | 11/2006 | Jiang et al. | |
| 7,212,617 B2 | 5/2007 | Owens et al. | |
| 7,269,162 B1 | 9/2007 | Turner | |
| 7,356,137 B1 | 4/2008 | Burg et al. | |
| 2001/0005412 A1 * | 6/2001 | Light et al. | 379/88.13 |
| 2001/0039585 A1 | 11/2001 | Primak et al. | 709/228 |
| 2001/0044299 A1 | 11/2001 | Sandegren | 455/422 |
| 2001/0053213 A1 | 12/2001 | Truong et al. | 379/202.01 |
| 2001/0053214 A1 * | 12/2001 | Kleinoder et al. | 379/207.04 |
| 2002/0006803 A1 | 1/2002 | Mendiola et al. | 455/466 |
| 2002/0024947 A1 | 2/2002 | Luzzatti et al. | 370/352 |
| 2002/0032035 A1 | 3/2002 | Teshima | |
| 2002/0035605 A1 | 3/2002 | McDowell et al. | 709/206 |
| 2002/0038360 A1 | 3/2002 | Andrews et al. | 709/223 |
| 2002/0049842 A1 | 4/2002 | Huetsch et al. | |
| 2002/0055975 A1 | 5/2002 | Petrovykh | 709/205 |
| 2002/0059622 A1 | 5/2002 | Grove et al. | 725/91 |
| 2002/0060988 A1 | 5/2002 | Shtivelman | 370/259 |
| 2002/0065894 A1 | 5/2002 | Dalal et al. | 709/206 |
| 2002/0076010 A1 | 6/2002 | Sahai | 379/88.19 |
| 2002/0078188 A1 | 6/2002 | Anand et al. | 709/222 |
| 2002/0085516 A1 | 7/2002 | Bridgelall | |
| 2002/0101993 A1 | 8/2002 | Eskin | 380/270 |
| 2002/0102993 A1 | 8/2002 | Hendrey et al. | |
| 2002/0111173 A1 | 8/2002 | Hendrey et al. | |
| 2002/0114432 A1 | 8/2002 | Shaffer et al. | 379/90.01 |
| 2002/0116336 A1 | 8/2002 | Diacakis et al. | 705/51 |
| 2002/0116461 A1 * | 8/2002 | Diacakis et al. | 709/204 |
| 2002/0120687 A1 | 8/2002 | Diacakis et al. | 709/204 |
| 2002/0126701 A1 | 9/2002 | Requena | 370/469 |
| 2002/0131395 A1 * | 9/2002 | Wang | 370/349 |
| 2002/0143876 A1 | 10/2002 | Boyer et al. | 709/205 |
| 2002/0143877 A1 | 10/2002 | Hackbarth et al. | 709/205 |
| 2002/0147008 A1 | 10/2002 | Kallio | 455/426 |
| 2002/0147777 A1 | 10/2002 | Hackbarth et al. | 709/205 |
| 2002/0147814 A1 | 10/2002 | Kimchi et al. | 709/226 |
| 2002/0163572 A1 | 11/2002 | Center, Jr. et al. | 348/14.08 |
| 2002/0165000 A1 * | 11/2002 | Fok | 455/466 |
| 2002/0181693 A1 | 12/2002 | Ribera | 379/265.09 |
| 2002/0194335 A1 | 12/2002 | Maynard | 709/225 |
| 2002/0196770 A1 | 12/2002 | Lin | 370/349 |
| 2003/0004762 A1 | 1/2003 | Banerjee et al. | 705/5 |
| 2003/0018704 A1 | 1/2003 | Polychronidis et al. | 709/202 |
| 2003/0023623 A1 * | 1/2003 | Horvitz et al. | 707/500 |
| 2003/0023681 A1 | 1/2003 | Brown et al. | 709/204 |
| 2003/0026289 A1 | 2/2003 | Mukherjee et al. | 370/466 |
| 2003/0028621 A1 * | 2/2003 | Furlong et al. | 709/219 |
| 2003/0035529 A1 | 2/2003 | Baker | 379/211.02 |
| 2003/0037103 A1 | 2/2003 | Salmi et al. | 709/203 |
| 2003/0037113 A1 | 2/2003 | Petrovykh | 709/205 |
| 2003/0041101 A1 | 2/2003 | Hansche et al. | 709/203 |
| 2003/0048195 A1 | 3/2003 | Trossen | 340/825.49 |
| 2003/0052915 A1 | 3/2003 | Brown et al. | 345/752 |
| 2003/0055897 A1 | 3/2003 | Brown et al. | 709/205 |
| 2003/0059029 A1 | 3/2003 | Mengshoel et al. | 379/265.02 |
| 2003/0065721 A1 | 4/2003 | Roskind | 709/204 |
| 2003/0065788 A1 | 4/2003 | Salomaki | 709/227 |
| 2003/0069934 A1 | 4/2003 | Garcia-Martin et al. | |
| 2003/0073440 A1 | 4/2003 | Mukherjee et al. | 455/435 |
| 2003/0078979 A1 | 4/2003 | Sagi | |
| 2003/0093482 A1 | 5/2003 | Watanabe et al. | |
| 2003/0101278 A1 | 5/2003 | Garcia-Luna-Aceves et al. | 709/240 |
| 2003/0104819 A1 | 6/2003 | Knauerhase et al. | |
| 2003/0105820 A1 | 6/2003 | Haims et al. | 709/205 |
| 2003/0129972 A1 | 7/2003 | Tosaki et al. | 455/414 |
| 2003/0134638 A1 | 7/2003 | Sundar et al. | |
| 2003/0135624 A1 * | 7/2003 | McKinnon et al. | 709/228 |
| 2003/0154293 A1 | 8/2003 | Zmolek | 709/228 |
| 2003/0174814 A1 | 9/2003 | Diacakis | 379/80 |
| 2003/0206619 A1 | 11/2003 | Curbow et al. | 379/210.01 |
| 2003/0217099 A1 * | 11/2003 | Bobde et al. | 709/202 |
| 2003/0217142 A1 * | 11/2003 | Bobde et al. | 709/224 |
| 2003/0225848 A1 | 12/2003 | Heikes et al. | |
| 2003/0229722 A1 | 12/2003 | Beyda | |

| | | |
|---|---|---|
| 2003/0233537 A1 | 12/2003 | Wohlgemuth et al. |
| 2003/0235287 A1 | 12/2003 | Margolis ............... 379/265.01 |
| 2004/0037271 A1 | 2/2004 | Liscano et al. .............. 370/352 |
| 2004/0044647 A1 | 3/2004 | Salmenkaita ................... 707/1 |
| 2004/0059781 A1* | 3/2004 | Yoakum et al. ............. 709/204 |
| 2004/0072593 A1 | 4/2004 | Robbins et al. |
| 2004/0073614 A1 | 4/2004 | Blohm |
| 2004/0122810 A1 | 6/2004 | Mayer ........................... 707/3 |
| 2004/0122901 A1* | 6/2004 | Sylvain ...................... 709/206 |
| 2004/0125941 A1* | 7/2004 | Yoakum ............... 379/266.02 |
| 2004/0153506 A1 | 8/2004 | Ito et al. ..................... 709/204 |
| 2004/0172528 A1 | 9/2004 | Tenereillo |
| 2004/0174966 A1 | 9/2004 | Koch ....................... 379/88.22 |
| 2004/0177278 A1 | 9/2004 | Lipton |
| 2004/0203746 A1 | 10/2004 | Knauerhase et al. |
| 2004/0249776 A1 | 12/2004 | Horvitz et al. ................. 706/21 |
| 2005/0041580 A1 | 2/2005 | Petrovykh |
| 2005/0044144 A1* | 2/2005 | Malik et al. ................. 709/205 |
| 2005/0074101 A1 | 4/2005 | Moore et al. ........... 379/114.01 |
| 2005/0086211 A1 | 4/2005 | Mayer |
| 2005/0117570 A1 | 6/2005 | Cetusic et al. .............. 370/352 |
| 2005/0172011 A1 | 8/2005 | Gourlay et al. |
| 2006/0078101 A1 | 4/2006 | Light et al. |
| 2007/0189489 A1 | 8/2007 | Carnazza et al. |

FOREIGN PATENT DOCUMENTS

| | | |
|---|---|---|
| EP | 1 148 688 A1 | 10/2001 |
| EP | 1 225 752 A2 | 7/2002 |
| EP | 1 329 810 A1 | 7/2003 |
| WO | A 99/17194 | 4/1999 |
| WO | WO 99/34628 | 7/1999 |

OTHER PUBLICATIONS

Rosenberg, J. and Schulzrinne, H., "draft-rosenberg-sip-pip.00.txt: SIP for Presence," IETF Internet Draft, Nov. 13, 1998, pp. 1-22, XP002325320.

European Search Report for 03257957.5, mailed Aug. 24, 2005.

Brodsky, Alexander et al., "Resource Management in Agent-based Distributed Environments," Proceedings of the 1999 International Symposium on Kyoto, Japan Nov. 28-30, 1999, pp. 95-108, XP010379697.

Chapin, Steve J. et al., "Resource Management in Legion," Future Generations Computer Systems, Elsevier Science Publishers, Amsterdam, Netherlands, vol. 15, No. 5-6, Oct. 1999, pp. 583-594, XP004176748.

Krauter, Klaus, etal., "A Taxonomy and Survey of Grid Resource Management Systems for Distributed Computing," Software Practice & Experience, John Wiley & Sons Ltd., Chichester, Great Britain, vol. 32, No. 2, Feb. 2, 2002, pp. 135-164, XP001091827.

International Search Report for PCT/IB03/05780 mailed Jan. 27, 2005.

Day, M. et al., "A Model for Presence and Instant Messaging," IETF REquest for Comments, XX, XX, No. 2778, Feb. 2000, pp. 1-17.

Rosenberg, J. et al., "SIP for Presence," IETF Internet Draft, Nov. 13, 1998, XP002173451.

Shim, Hyong Sop et al., "An Example of Using Presence and Availability in an Enterprise for Spontaneous, Multiparty, Multimedia Communications," IPTEL 2001, Apr. 3, 2001, XP002252324.

International Search Report for PCT/IB03/06073, mailed May 4, 2004.

Eschenburg, Axel, "Wo Laufen Sie Denn? ICQ Haelt Verbindung Zu Bekannten," CT Magazin Fuer Computer Technik, Verlag Heinz Heise GMBH, Hannover, Germany, No. 22, Oct. 26, 1998, pp. 92-95, Translation Provided.

Kohda et al., "IMPP: A New Instant Messaging Standard and Its Impact on Internet Business," Fujitsu-Scientific and Technical Journal, Fujitsu Limited, Kawasaki, Japan, vol. 36, No. 2, Dec. 2000, pp. 147-153.

PCT International Search Report for PCT/IB03/04250, mailed Jan. 19, 2004.

PCT International Search Report for PCT/IB03/03962, mailed Jan. 28, 2004.

International Search Report for related application PCT/US02/40882, mailed Oct. 8, 2003.

International Search Report for PCT/IB02/05523 mailed Apr. 15, 2003.

International Search Report for PCT/IB03/03994 mailed Mar. 30, 2004.

* cited by examiner

DISTRIBUTED SERVICES BASED ON PRESENCE TECHNOLOGY

FIELD OF THE INVENTION

The present invention relates to providing distributed services, and in particular to providing such services using a presence-based platform.

BACKGROUND OF THE INVENTION

A distributed services environment is one that provides services to end users via a number of discrete and collaborating processing points, often referred to as agents, that interact to provide the services. A common example of a distributed service is providing simultaneous ringing in response to an incoming call. When one telephone is answered, the others will stop ringing. In a more complex example, called a multiple appearance directory number (MADN) environment, a group of telephones act in concert to answer an incoming session, and may subsequently transfer possession of the session to one or more of the telephones in the group. Distributed services also allow the collaboration of media-specific devices where two or more devices having different media capabilities collaborate to control a single media session. A distributed services environment may provide group services, such as automatic call distribution (ACD), MADN services, hunt group behavior, trunk selection, multimedia conferencing, and the like. Call distribution services allow groups of agents to service calls from an incoming pool of queued calls in a fair or otherwise specified manner. Hunt group or trunk selection allows calls to be accepted when possible by a limited facility, if there are sufficient resources available. In general, distributed telecommunications services can be defined as either structured or amorphous, wherein structured services imply that all participants in a group are not equal, have different roles in the services, or have a hierarchical relationship in execution of the service. Amorphous services are those where the participants in the group are substantially equal and have substantially identical roles.

In a distributed services environment, the multiple agents involved in providing a particular service need to exchange information amongst each other as well as discover the identity and the ability of both users and agents to participate in a specific service. In general, agents need to be able to declare their existence on the network, discover other participants, such as users and agents, for a given service, and exchange state information between active and discovered agents. Unfortunately, there is no uniform, standards-based manner in which to achieve such interaction at an applications level. Accordingly, there is a need to provide distributed services using uniform, application-level protocols that permit diverse implementations of distributed service agents to create and provide distributed services.

SUMMARY OF THE INVENTION

The present invention provides distributed communication services based on a presence technology platform. Presence messaging and communication techniques allow a variety of communication agents to cooperate with one another to provide distributed services. Essentially, the messaging between the agents is used to facilitate media sessions and update participating devices of state changes bearing on providing the services. In one embodiment, each of the participating devices is associated with a logic entity, referred to as a presentity, which subscribes to notification services for the other participating devices. When a state change occurs on any one of the participating devices, the corresponding presentity notifies the other devices of the state change. As such, each participating device knows the status of the other participating devices via the presentities and can systematically determine when and how to provide services based on its current state and the current state of the other participating devices.

In another embodiment, a primary, or focal device within the group is identified and used to facilitate overall control of the group. Accordingly, presentities for the participating devices subscribe to a presentity for the focal device. Further, the presentity for the focal device may subscribe to presentities for the participating devices to receive notifications of state changes. As events take place in the participating devices, the affected presentity will notify the presentity of the focal device, which will operate to notify the other presentities of the state change. The focal device's presentity will also notify the participating devices' presentities of state changes occurring in or associated with the focal device. Again, these state changes facilitate the distribution of services by allowing each of the participating devices and focal device to be aware of one another's state or capabilities as they pertain to providing communication services.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention provides distributed services in various communication environments based on a presence platform. Presence systems generally keep track of the apparent availability of individuals, and perhaps their location, by monitoring their relative interaction with various communication devices. A presence system may determine the individual's availability, and provide information pertaining to this availability to a user who subscribes to a presence service. Typically, the user subscribes to receive presence information pertaining to the availability of multiple individuals. As the monitored individuals go through their daily business, their availability will change from time to time. Changes in availability typically result in a notification being provided to the subscribing user.

The information bearing on availability is generally referred to as presence information, and is derived from state information bearing on the state of an identified entity associated with a user. Accordingly, presence information is determined by monitoring state information derived from a number of sources, which are associated with individuals. In many instances the sources of state information are devices that are frequently used by an individual throughout a normal day and are configured to provide state information to a central presence system. The sources monitor normal user interactions and provide state information to the presence system, which will evaluate the state information from one or more of the sources to create presence information to deliver to subscribers. The state information bears on the presence or availability of the user, and may take many forms. The presence information may range from a complex analysis of state information from many devices, to simply the states of selected devices.

Figure 1:
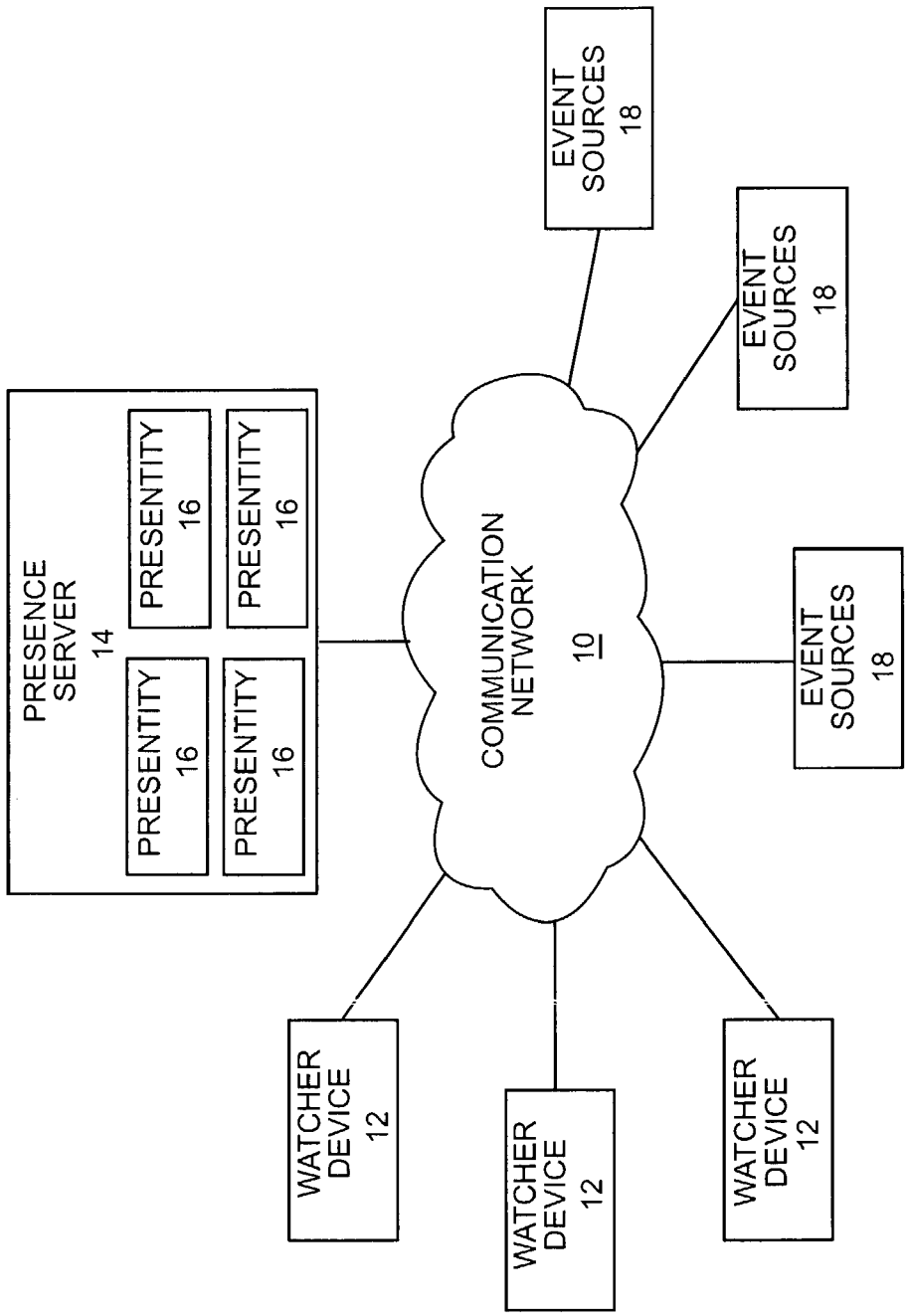
FIG. 1 is a block representation of a presence architecture of the prior art.

With reference to FIG. 1, an exemplary presence system is illustrated. In general, a communication network 10 supports communications between a plurality of watcher devices 12, a presence server 14 providing one or more logical presentities 16, and numerous event sources 18. The watcher devices 12 are the entities that subscribe to the presentities 16 of the presence system to receive presence information based on changes in state of event sources 18 associated with a corresponding presentity 16. The presentity 16 determines changes in state by receiving event notifications from one or more of the event sources 18 via the presence server 14 or like presence function, processes the event notifications to create presence information, and delivers the presence information to the subscribing watcher devices 12 as necessary. The presence function may be centralized or distributed in presence servers 14 or other devices.

In general, a presence system will use several messages to facilitate operation. A REGISTER message allows participating presentities 16 to register with the presence server 14 to establish their identities, facilitate authentication, indicate presentity state change, and negotiate their respective responsibilities on the network 10. SUBSCRIBE messages are used by the watcher devices 12 to request a persistent relationship with a presentity 16 such that the presentity 16 will communicate presence information to the watcher device 12. NOTIFY messages are used to send updated presence information to the watcher devices 12, while a FETCH message is used to update presence information about the presentity 16 without a persistent commitment. In general, the NOTIFY messages are used to provide updates based on an ongoing commitment, wherein the FETCH message requests presence information on an instantaneous basis.

Current presence technology standards and systems are provided for in references from the Internet Engineering Task Force (IETF). Presence technology protocol-related publications hereby incorporated by reference include: Day, M., Aggarwal, S. and Vincent, J., "Instant Messaging/Presence Protocol Requirements," Request for Comment (RFC) 2779, February 2000; Day, M., Rosenberg, J. and Sugano, H., "A Model for Presence and Instant Messaging," RFC 2778, February 2000; Crocker, D. et al., "A Common Profile for Instant Messaging (CPIM)," (work in progress), February 2001.

Figure 2:
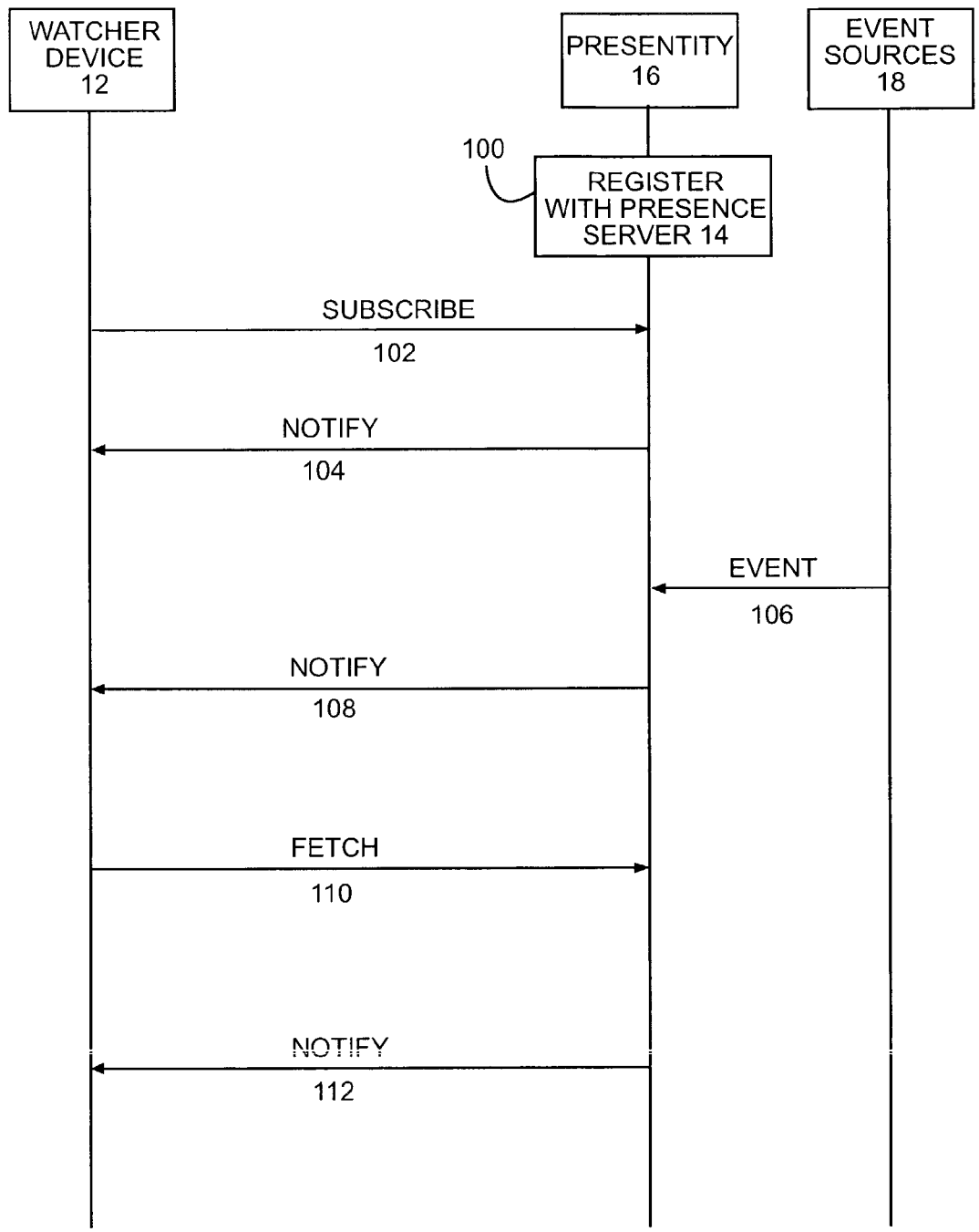
FIG. 2 is a flow diagram outlining basic presence flow according to the prior art.

A basic communication flow for a presence system is illustrated in FIG. 2. Initially, the presentity 16 will register with the presence server 14, and preferably provide initial state information (step 100). The registration will establish the presentity's ID, address, associated event sources 18, and requirements. Once registered, the presence server 14 will facilitate subscription of authorized watcher devices 12 to receive state information pertaining to the presentity 16.

Next, a watcher device 12 may subscribe to receive presence information pertaining to the presentity 16 by sending a SUBSCRIBE message to the presentity 16 via the presence server 14 (step 102). At this point, the presentity 16 may directly or indirectly provide presence information via the presence server 14 to the watcher device 12. The presentity 16 may send a NOTIFY message, which includes the presentity's current state, to the watcher device 12 (step 104). Next, the presentity 16 will monitor one or more event sources 18 for a notification of a state change for an associated device. When an event indicative of a state change is received from the event source 18 (step 106), the presentity 16 will process the information and provide presence information in a NOTIFY message to inform all watcher devices 12 of the state change (step 108). This process of receiving event notifications and providing updated presence information via the NOTIFY messages will repeat until the subscription ends. In addition to receiving the presence information upon state changes, the watcher device 12 may request current presence information by sending a FETCH message to the presentity 16 via the presence server 14 (step 110), which will respond with a NOTIFY message containing the current presence information of the presentity 16 (step 112).

Figure 3:
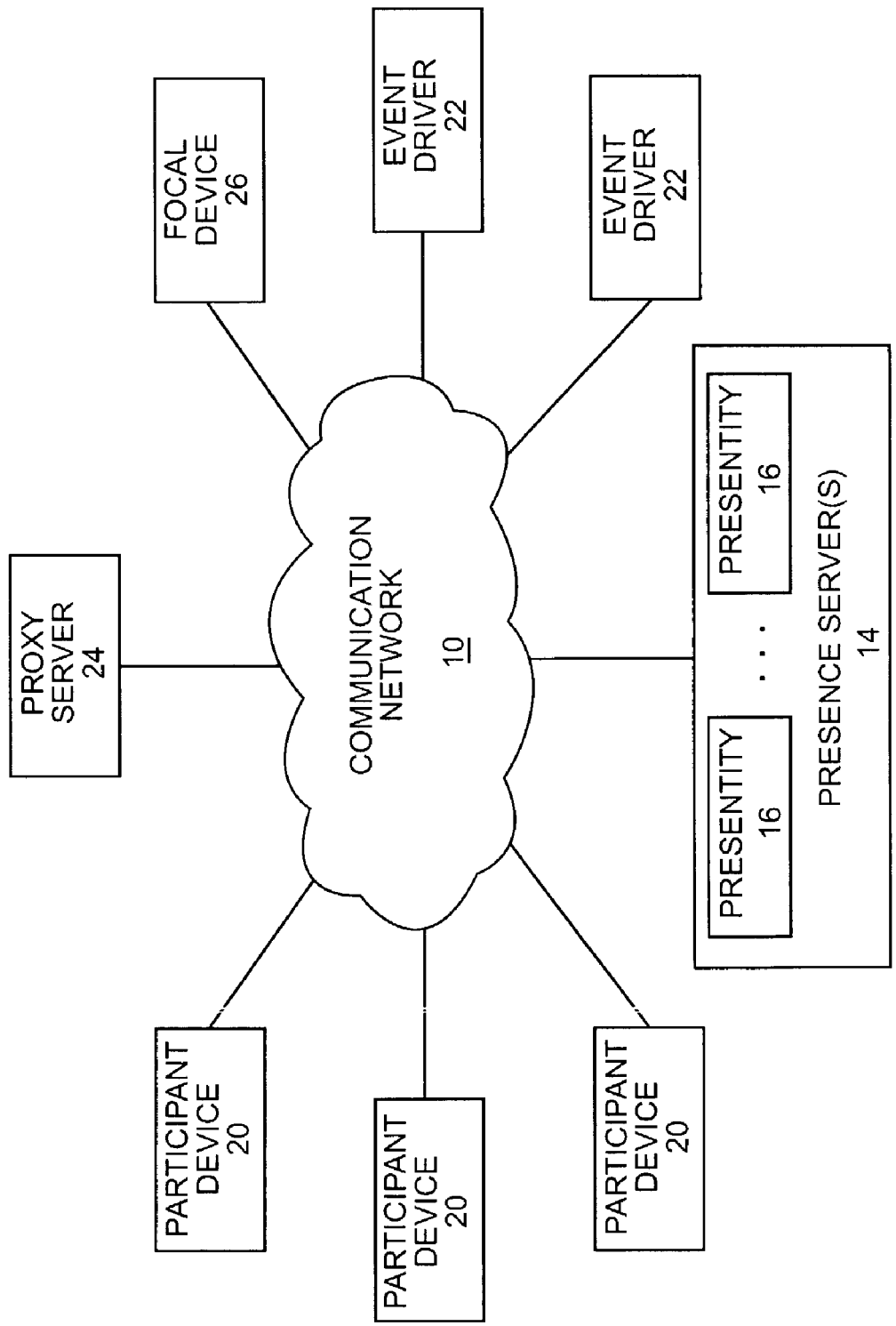
FIG. 3 is a communication environment capable of providing distributed services over a presence-based platform according to one embodiment of the present invention.

As noted above, the present invention relates to providing distributed communication services on a presence platform. Accordingly, the present invention uses presence messaging and communication techniques to allow a variety of communication agents to cooperate with one another to provide distributed services. Numerous examples are provided below in association with the basic communication environment 10 illustrated in FIG. 3. Notably, the elements illustrated in FIG. 3 are introduced as they appear in the communication flows of FIGS. 4-7B.

Figure 4:
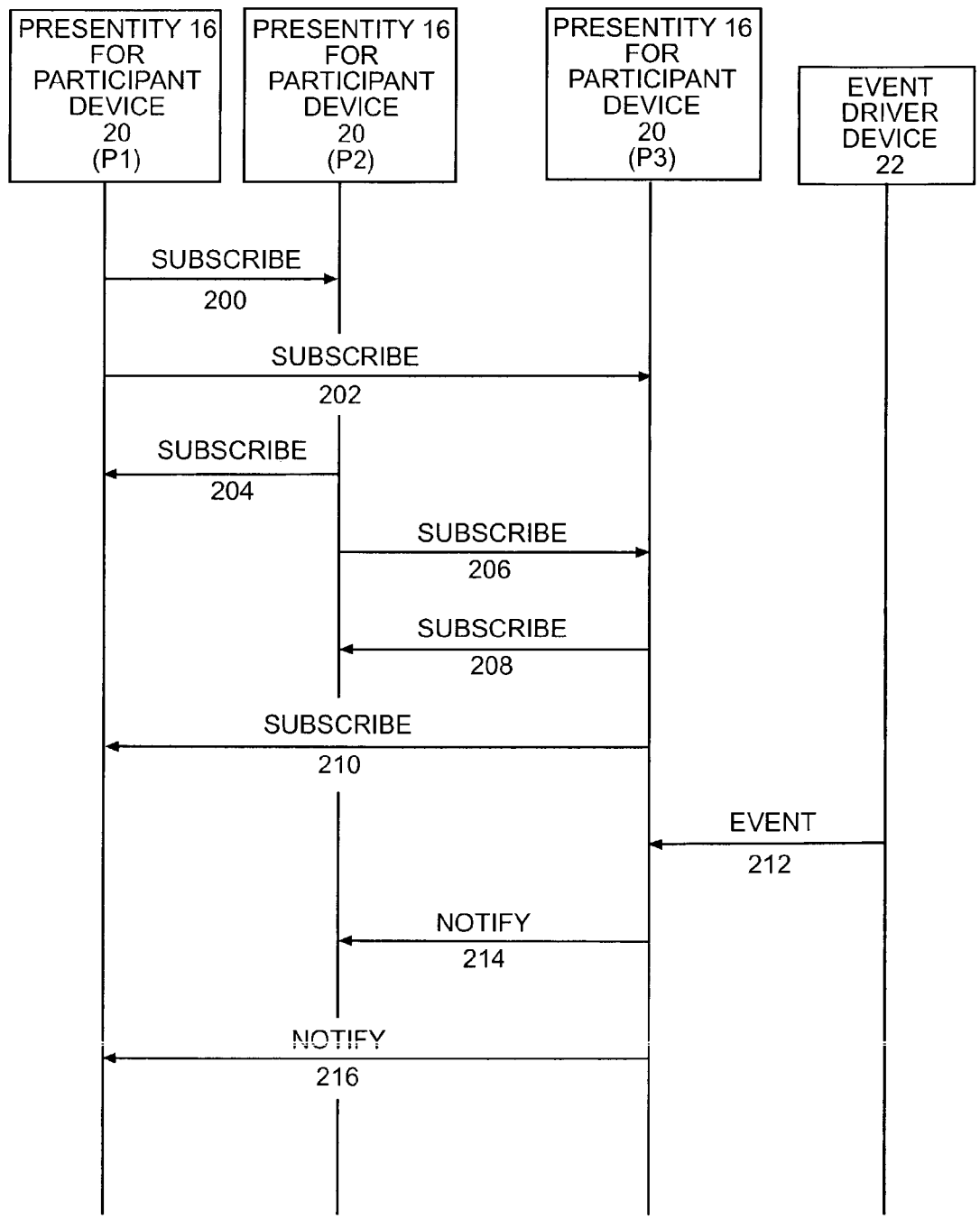
FIG. 4 is a call flow diagram for providing distributed services in an amorphous environment.

A generic communication flow for an amorphous distributed services environment is provided in FIG. 4. In an amorphous distributed services environment, numerous participant devices 20 have substantially the same capabilities and operational characteristics. Each of the participant devices 20 knows about the other participant devices 20 via some mechanism. Further, each participant device 20 is associated with a presentity 16, which watches all of its peers and informs all of its peers of significant service-related changes. The operation or service behaviors for each of the participant devices 20 is based on information gathered from the presentities 16 associated with its peers. Again, each of these participant devices 20 is represented by a presentity 16 in a presence system 14.

The presentities 16 may communicate with the participant devices 20 via any available communication technology. For the sake of conciseness and readability, a presentity 16 for a particular participant device 20 will be referred to as a presentity PX, where X identifies the particular participant device 20.

With particular reference to FIG. 4, all of the presentities 16 for participant devices 20 will subscribe to receive updates pertaining to significant service-related changes from each of its peers. As such, the presentity 16 for participant device 20 (P1) will subscribe to receive updates from the presentities 16 for the other participant devices 20 (P2 and P3) by sending SUBSCRIBE messages to presentities P2 and P3 via the presence server 14 (steps 200 and 202). Presentity P2 will subscribe to presentities P1 and P3 by sending SUBSCRIBE messages to presentities P1 and P3 (steps 204 and 206). Finally, presentity P3 will send SUBSCRIBE messages to presentities P2 and P1 to receive updates (steps 208 and 210). At this point, presentities P1, P2, and P3 have subscribed to receive updates pertaining to service-related changes that affect any one of the corresponding participant devices 20. As such, when an event notification is received from an event driver device 22 by presentity P3 (step 212), presentity P3 will send NOTIFY messages to presentities P2 and P1 (steps 214 and 216) to indicate changes in state or behavior of corresponding participant device 3 due to receiving the event notification. Each of the presentities P1, P2, and P3 will communicate such information with the corresponding participant devices 1, 2, and 3 through the presence server 14 or other device or system as desired.

Figure 5:
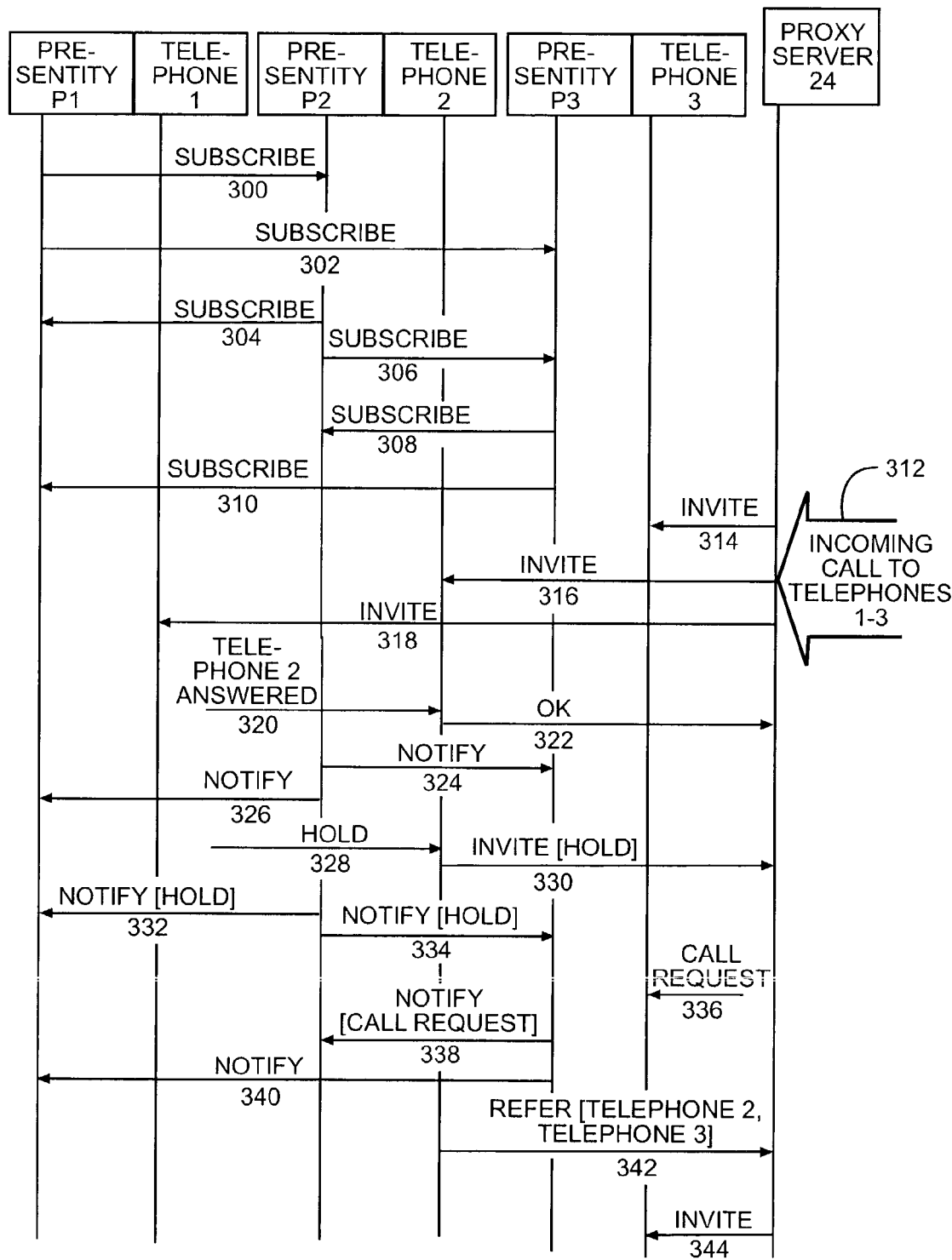
FIG. 5 is a call flow diagram for providing distributed services in a multiple appearance directory number environment.

FIG. 5 illustrates an exemplary messaging flow in an amorphous implementation of a multiple appearance directory number (MADN) service where multiple telephones are rung, one is answered, the call is held, another phone requests the call, and the call is handed to the requesting telephone. In this example, the session initiation protocol (SIP) is used for the exchange of state information and the presentation of sessions or calls. In the flow, all required state information is passed between each of the participant devices 20, which are telephones 1-3 in this example. The telephones 1-3 and associated presentities P1-P3 will communicate with each other as necessary to recognize states or trigger services. In general, once a presentity 16 for a telephone receives state information indicating that another telephone has changed state, the receiving telephone may execute service logic and change state itself. Other MADN-based services that can be specified in a similar manner include MADN conference and MADN transfer to an idle telephone.

The Session Initiation Protocol (SIP) or the SIP for Instant Messaging and Presence Leveraging Extensions (SIMPLE) protocol is implemented in one embodiment of the present invention. The specification for SIP is provided in the Internet Engineering Task Force's RFC 2543: Session Initiation Protocol Internet Draft, which is incorporated herein by reference in its entirety. In general, SIP is used to facilitate media sessions between any number of endpoints, which represent the devices communicating with each other, directly or indirectly via a SIP proxy. These endpoints may support any one or combination of data, audio, and voice media sessions, depending on the configuration of the respective endpoints.

A SIP endpoint is generally capable of running an application, which is generally referred to as a user agent (UA), and is capable of facilitating media sessions using SIP. User agents register their ability to establish sessions with a SIP proxy, such as proxy server 24, by sending "REGISTER" messages to the SIP proxy. The REGISTER message informs the SIP proxy of the SIP universal resource locator (URL) that identifies the user agent to the SIP network. The REGISTER message also contains information about how to reach specific user agents over the SIP network, by providing the Internet Protocol (IP) address and port that the user agent will use for SIP sessions. A REGISTER message can also contain state information that is used to update and maintain the state of a presentity 16.

A "SUBSCRIBE" message may be used to subscribe to an application or service provided by a SIP endpoint. Further, "NOTIFY" messages may be used to provide information between SIP endpoints in response to various actions or messages, including REGISTER and SUBSCRIBE messages. When a user agent wants to establish a session with another user agent, the user agent initiating the session will send an INVITE message to the SIP proxy and specify the targeted user agent in the TO header of the INVITE message. Identification of the user agent takes the form of a SIP URL. In its simplest form, the URL is represented by a number or "<username>@<domain>," such as "janedoe@nortelnetworks.com." The SIP proxy will use the SIP URL in the TO header of the message to determine if the targeted user agent is registered with the SIP proxy. Generally, the user name is unique within the name space of the specified domain.

If the targeted user agent has registered with the SIP proxy, the SIP proxy will forward the INVITE message directly to the targeted user agent. The targeted user agent will respond with a 200 OK message, and a session between the respective user agents will be established as per the message exchange required in the SIP specification. Media capabilities are passed between the two user agents of the respective endpoints as parameters embedded within the session setup messages, such as the INVITE, 200 OK, and acknowledgement (ACK) messages. The media capabilities are typically described using the Session Description Protocol (SDP). Once respective endpoints are in an active session with each other and have determined each other's capabilities, the specified media content may be exchanged during an appropriate media session.

Initially, presentities P1, P2, and P3 for each of the participant devices 20 (TELEPHONE 1, TELEPHONE 2, and TELEPHONE 3), will register the need to receive updates with each other. As such, presentity P1 for TELEPHONE 1 will send SUBSCRIBE messages to presentity P2 for TELEPHONE 2 and presentity P3 for TELEPHONE 3 (steps 300 and 302), presentity P2 for TELEPHONE 2 will send SUBSCRIBE messages to presentity P1 for TELEPHONE 1 and presentity P3 for TELEPHONE 3 (steps 304 and 306), and presentity P3 for TELEPHONE 3 will send SUBSCRIBE messages to presentity P2 for TELEPHONE 2 and presentity P1 for TELEPHONE 1 (steps 308 and 310). At this point, each presentity (P1-P3) for each telephone (1-3) is configured to notify the others of changes in state. In this environment, assume that each of the telephones 1-3 is configured to simultaneously ring in response to an incoming call to a defined directory number or address. Typically, a proxy server 24 will recognize an incoming call to telephones 1-3 (step 312) and send INVITE messages to TELEPHONE 3 (step 314), TELEPHONE 2 (step 316), and TELEPHONE 1 (step 318) to initiate a media session. Although not illustrated, any of the INVITE messages may be responded to with a 200 OK message.

For this example, assume that TELEPHONE 2 is answered (step 320). As such, TELEPHONE 2 will send an OK message in response to the INVITE message to the proxy server 24 (step 322), and presentity P2 will send NOTIFY messages to presentities P3 and P1 indicating that it was answered (steps 324 and 326). Further assume that after establishment of a media session with TELEPHONE 2, the media session was placed on hold by the user of TELEPHONE 2 (step 328). In response, TELEPHONE 2 will send an INVITE message placing the call on hold to the proxy server 24 (step 330), which will forward the hold message on to the device originating the media session in a direct or indirect fashion. Presentity P2 will then send NOTIFY messages to presentities P1 and P3 indicating that TELEPHONE 2 has placed the media session on hold (steps 332 and 334).

Assuming the held session will be taken over by TELEPHONE 3 in response to a call request (step 336), presentity P3 will send a NOTIFY message including a request to take over the call to presentity P2 (step 338) and send a NOTIFY message indicating the same to presentity P1 (step 340). In response, TELEPHONE 2 will refer the session to TELEPHONE 3 by sending a REFER message to the originator of the call via the proxy server 24 (step 342), whereupon the originator of the call will respond by sending an INVITE message configured to establish the media session with TELEPHONE 3 via the proxy server 24 (step 344). Presentity P3 will then notify presentities P1 and P2 of the state change in the above-described fashion (not shown).

In the amorphous environment described above, each of the participant devices 20 has substantially the same capabilities and responsibilities. However, certain distributed services require one of the participant devices 20 to play a more significant or centralized role. For example, some participant devices 20 may act in special roles that serve to distribute messages to other participants. In the present case, these special participant devices are referred to as focal devices 26. Typically, a presentity 16 associated with a focal device 26 governs the distribution of state information, although such logic is not required. In general, each participant device 20 will effectively watch one or more focal devices 26 via their presentities 16, and state changes at a participant device 20 will typically result in notifying the presentity 16 of the focal device 26.

Figure 6:
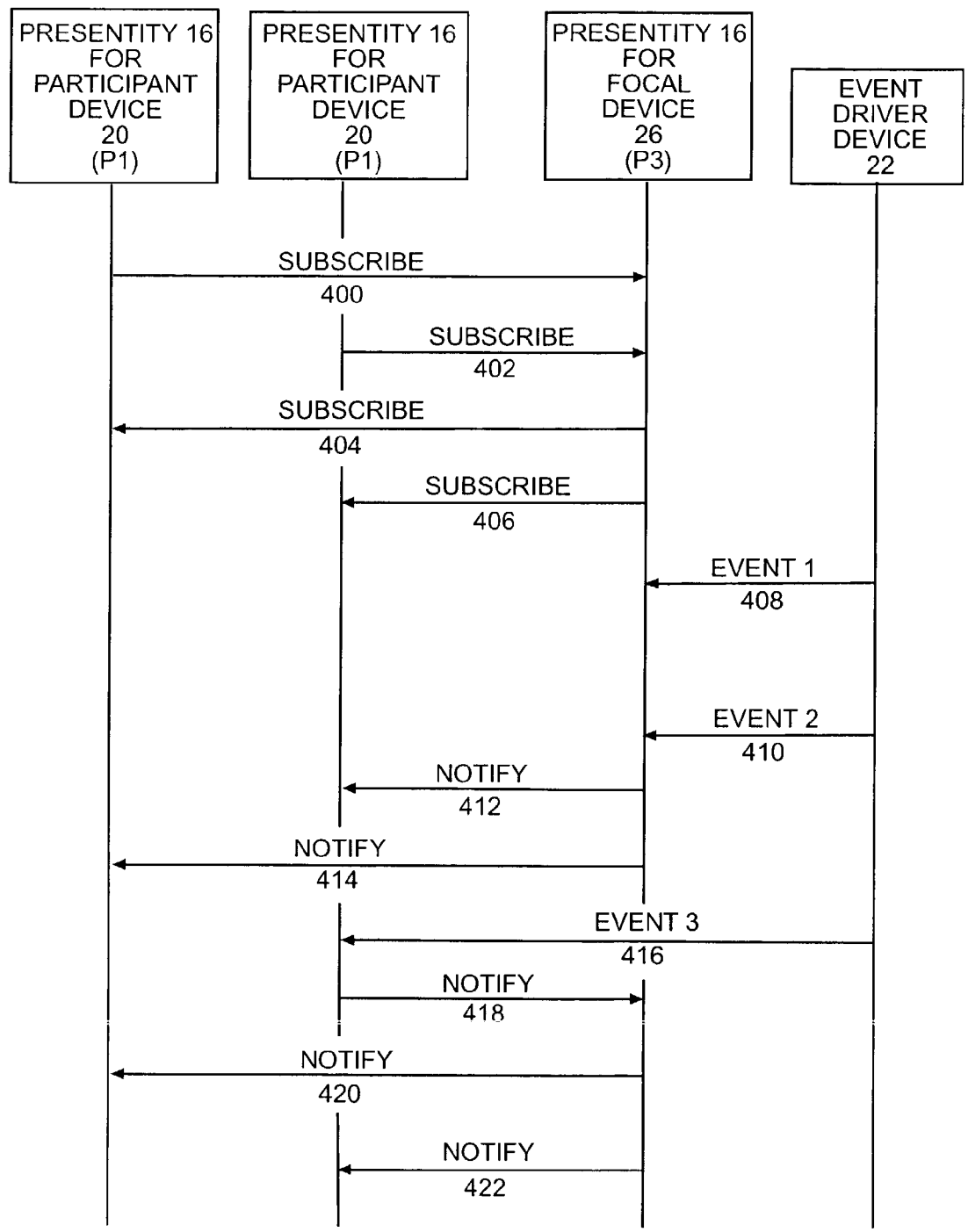
FIG. 6 is a call flow diagram for providing distributed services in a structured environment.

An exemplary message flow for a structured environment is provided in FIG. 6. Initially, presentities P1 and P2 will send SUBSCRIBE messages to presentity P3 of the focal device 26 to effectively register the participant devices 20 with the focal device 26 to receive state information (steps 400 and 402). Additionally, presentity P3 of the focal device 26 may elect to receive state information from presentities P1 and P2 by sending SUBSCRIBE messages thereto (steps 404 and 406).

During operation, presentity P3 will receive event notifications from one or more event driver devices 22. Depending on the event notification, presentity P3 will process the information provided in the event notification and determine whether or not presentities P1 and P2 need to be sent notification in response to the event notification received from the event driver device 22. Thus, for a first event (EVENT 1) (step 408), presentity P3 determines that no notification to either presentity P1 or P2 is required. For a second event (EVENT 2) (step 410), presentity P3 determines there is a need to notify the presentities P1 and P2 by sending a NOTIFY message to presentities P1 and P2 (steps 412 and 414). Thus, presentity P3 of the focal device 26 may notify presentities P1 and P2 for associated participant devices 20 of state changes.

Notably, the presentities P1 and P2 may also receive events from event driver devices 22, directly or via the participant devices 20. In this example, a third event notification (EVENT 3) is issued from the event driver device 22 directly to presentity P2 (step 416) and not to presentity P3 of the focal device 26. In response to the EVENT 3 notification, presentity P2 will change states, and send a NOTIFY message bearing on the state change to presentity P3 (step 418). In response, presentity P3 will send NOTIFY messages to presentity P1 (step 420) and optionally presentity P2 (step 422) indicative of the state change to allow the presentities P1 and P2 or the participant devices 20 (1, 2) to take the appropriate action.

Figure 7A:
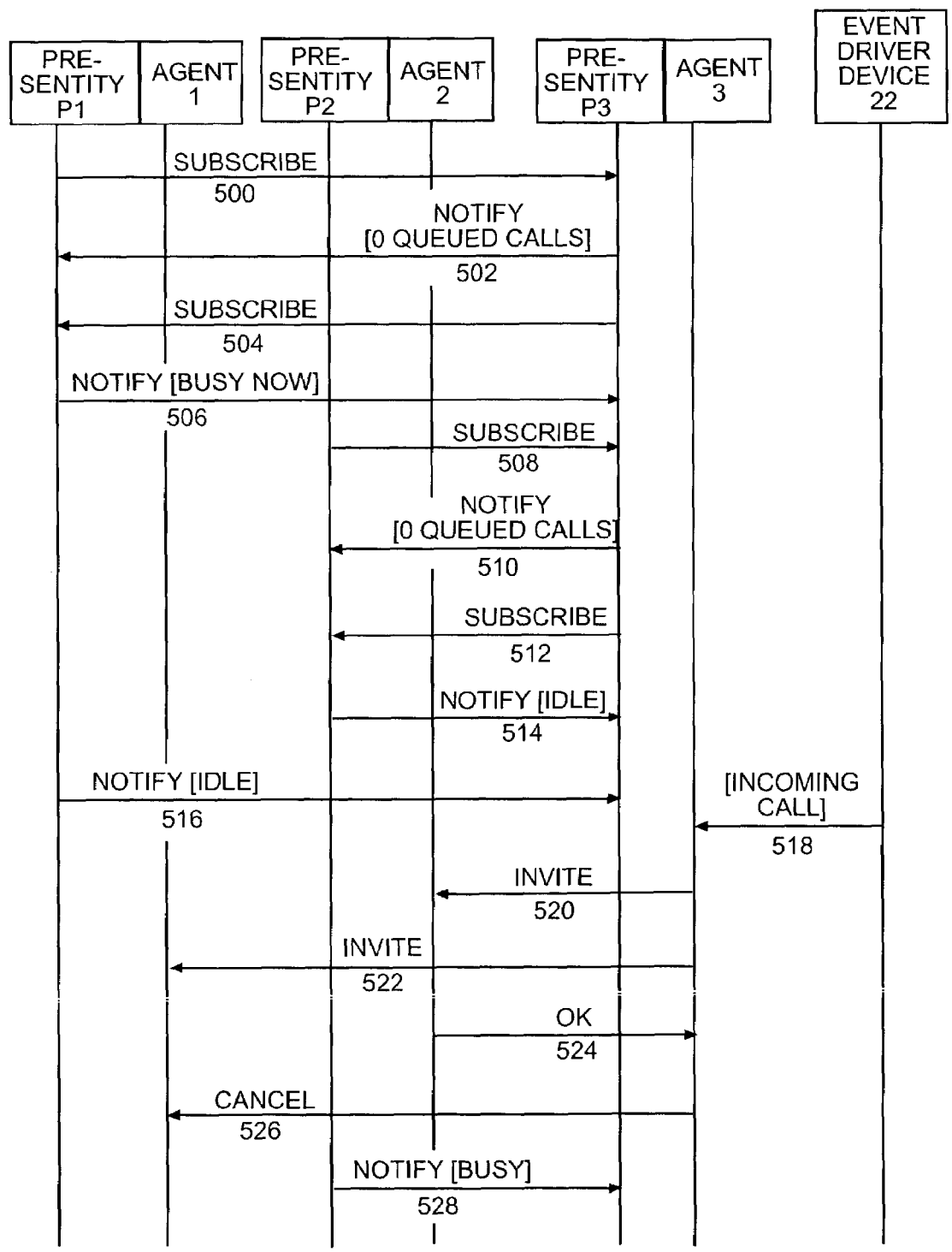
FIGS. 7A and 7B are a call flow diagram for providing distributed services in an automatic call distribution environment.
Figure 7B:
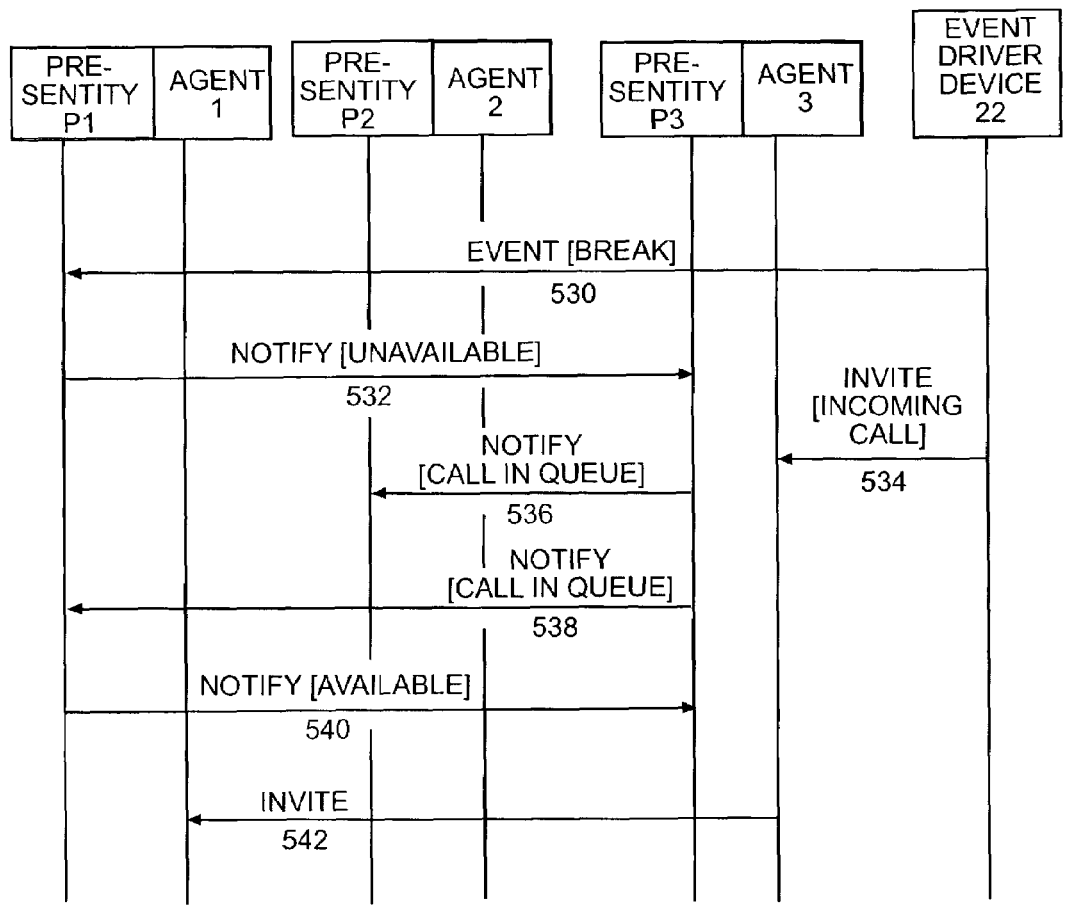

An exemplary structured environment for call distribution is provided in FIGS. 7A and 7B. In this embodiment, participant availability and queued call status are treated as presence information that is handed out to subscribing agents (AGENT 1 and AGENT 2) implemented on participant devices 20. Similarly, AGENT 3 is a subscribing agent for the focal device 26, which is affiliated with presentity P3. Given the structured nature of this embodiment, the presentities P1 and P2 of AGENT 1 and AGENT 2 initially register with presentity P3 of the focal device 26. Accordingly, presentity P1 will send a SUBSCRIBE message to presentity P3 (step 500), which will preferably respond with initial state information via a NOTIFY message (step 502). As illustrated, the NOTIFY message will tell presentity P1 that there are zero queued calls. Further, presentity P3, which acts as a queue, will subscribe to presentity P1 by sending a SUBSCRIBE message (step 504). In response to the SUBSCRIBE message, presentity P1 will provide a NOTIFY message alerting the queue of the state of AGENT 1 (step 506). In this example, AGENT 1 is currently unavailable. The process is repeated for presentity P2, wherein presentity P2 will send a SUBSCRIBE message to presentity P3 (step 508), which will respond with a NOTIFY message indicating that there are zero queued calls (step 510). Presentity P3 will then send a SUBSCRIBE message to presentity P2 (step 512), which will respond with a NOTIFY message indicating the state of AGENT 2, which is idle at this point (step 514).

At this point, AGENT 3 has effectively subscribed to receive state information from AGENT 1 and AGENT 2 via presentity P3. Thus, when AGENT 1 becomes idle, presentity P1 will send a NOTIFY message to presentity P3 indicating that AGENT 1 has become idle (step 516). Further, when an event driver device 22 sends an INVITE message to AGENT 3 to trigger a new call or media session (step 518), the focal device 26 will forward the INVITE message to one or more of the agents that are idle (steps 520 and 522). Assuming that AGENT 2 accepts the incoming call first, it will send an OK message back to the focal device 26 to indicate acceptance of the call (step 524). The focal device 26 will then send a CANCEL message to AGENT 1 to cancel the previously sent INVITE message (step 526). Since AGENT 2 is accepting the incoming call, its state will change from idle to busy. As such, presentity P2 will send a NOTIFY message to presentity P3 of the focal device 26 to indicate that AGENT 2 is now in a busy state (step 528). The focal device 26 will then update its queue.

In addition to incoming call control or media control signaling, the event driver device 22 may provide event triggers to AGENT 1 or AGENT 2 directly or via presentities P1 and P2. For example, if the event driver device 22 provides an event notification indicating that a user associated with AGENT 1 is on a break (step 530), AGENT 1 will change states and therefore instruct presentity P1 to send a notification message to presentity P3 of the focal device 26 indicating that AGENT 1 is unavailable (step 532). As such, the queue will always be provide updated state information for the participating agents AGENT 1 and AGENT 2.

When all of the agents are busy and an incoming call or media session is requested in an incoming INVITE message (step 534), presentity P3 will send NOTIFY messages to AGENT 1 and AGENT 2 indicating that there is a call in the queue (steps 536 and 538). Assuming that AGENT 1 becomes available first, it will send a NOTIFY message to presentity P3 upon becoming available (step 540). At that point, the focal device 26 will forward the INVITE message for the incoming call to AGENT 1 to initiate the call or media session (step 542).

Figure 8:
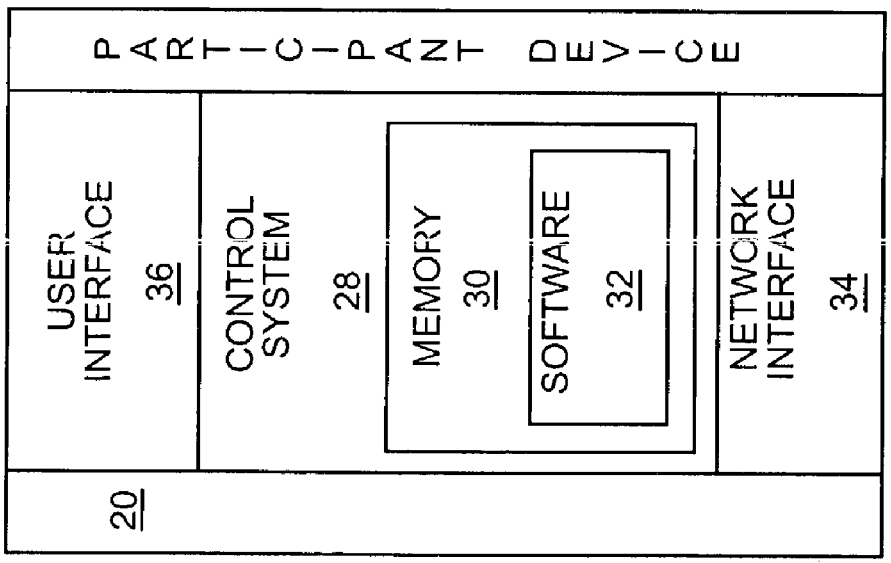
FIG. 8 is a block representation of a participant device according to one embodiment of the present invention.

A block representation of a participant device 20 is shown in FIG. 8. The participant device 20 will preferably include a control system 28 containing memory 30 and the requisite software 32 to facilitate operation. The participant device 20 may take many forms, and may serve as the core of many types of communication devices, such as wireless, packet-switched, or circuit-switched telephones or telephony equipment and associated peripherals, including computers and personal digital assistants. The control system 28 is also associated with a network interface 34 facilitating communications with the various devices over the communication network 10. The control system 28 is also associated with any available user interfaces 36 necessary to facilitate communications or operation of the participant device 20 in traditional fashion.

Figure 9:
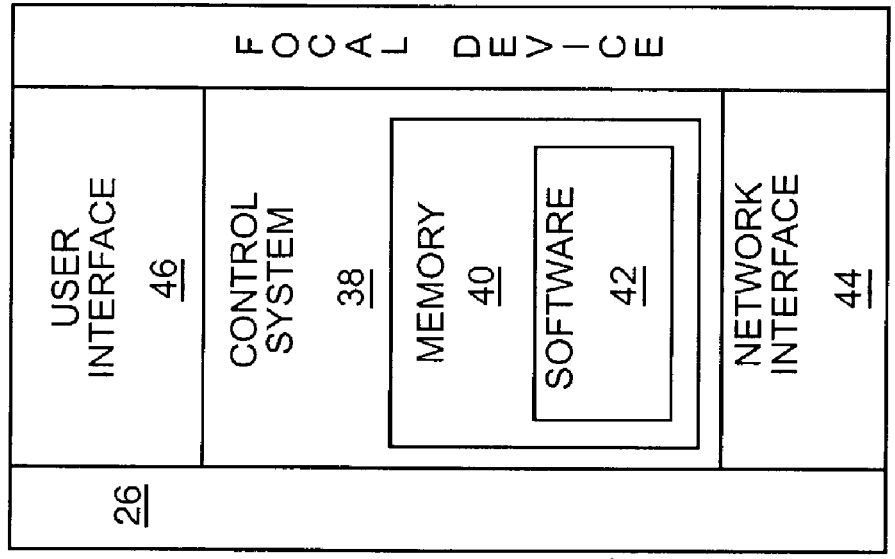
FIG. 9 is a block representation of a focal device according to one embodiment of the present invention.

A block representation of a focal device 26 is shown in FIG. 9. The focal device 26 will preferably include a control system 38 containing memory 40 and the requisite software 42 to facilitate operation. Just like the participant device 20, the focal device 26 may take many forms, and may serve as the core of many types of communication devices, such as wireless, packet-switched, or circuit-switched telephones or telephony equipment and associated peripherals, including computers and personal digital assistants. The control system 38 is also associated with a network interface 44 facilitating communications with the various devices over the communication network 10. The control system 38 is also associated with any available user interfaces 46 necessary to facilitate communications or operation of the focal device 26 in traditional fashion.

From the above, those skilled in the art will recognize various ways for implementing distributed services on presence platforms, and will recognize other improvements and modifications to the preferred embodiments of the present invention. All such improvements and modifications are considered within the scope of the concepts disclosed herein and the claims that follow.

What is claimed is:

1. A method for providing distributed communication services comprising:
   a) subscribing to a plurality of presentities for participant devices to receive notification when the participant devices change state, the participant devices adapted to provide a communication service;
   b) receiving a subscribe request from the presentities to provide notification of a change in state;
   c) determining the change in state; and
   d) notifying the presentities of the change in state.

2. The method of claim 1 further comprising receiving notification of the change in state for one of the participant devices.

3. The method of claim 1 wherein determining the change in state comprises:
   a) receiving a communication control message from a remote device;
   b) taking action in response to the communication control message; and
   notifying the presentities of the change in state comprises:
   c) sending a notification message to the presentities identifying the change in state.

4. The method of claim 1 wherein determining the change in state further comprises receiving indication of an event occurrence and changing state based on the event occurrence.

5. The method of claim 1 wherein communications with the presentities is based on a presence platform.

6. The method of claim 1 further comprising:
   a) receiving an invitation to initiate a media session from a remote device wherein the invitation is sent to the participant devices; and
   b) sending a notification to the presentities when the media session is accepted.

7. The method of claim 6 further comprising:
   a) receiving a hold instruction to place the media session on hold; and
   b) sending a notification message indicating the media session is held to other of the presentities.

8. The method of claim 7 further comprising:
   a) receiving a notification message requesting transfer of the media session to a select one of the participant devices; and
   b) sending a message to refer the media session to the select one of the participant devices.

9. The method of claim 8 wherein the notification message requesting transfer of the media session is received from a select one of the presentities.

10. The method of claim 8 wherein the media session is one of a voice or other media session.

11. A method for controlling distributed communication services via a focal device for a plurality of participant devices, the method comprising:
   a) receiving subscribe requests from a plurality of presentities associated with participant devices to provide notification of a change in state;
   b) determining the change in state; and
   c) notifying the presentities of the change in state.

12. The method of claim 11 further comprising subscribing to the plurality of presentities to receive notification when the participant devices change state, the participant devices adapted to provide a communication service.

13. The method of claim 12 wherein determining a change in state further comprises receiving indication of an event occurrence and changing state based on the event occurrence.

14. The method of claim 11 further comprising receiving notification of the change in state from one of the presentities.

15. The method of claim 11 wherein determining the change in state comprises:
   a) receiving a communication control message from a remote device;
   b) taking action in response to the communication control message wherein notifying the presentities of the change in state comprises
   sending a notification message to the presentities identifying the change in state.

16. The method of claim 11 wherein determining the change in state further comprises receiving indication of an event occurrence and changing state based on the event occurrence.

17. The method of claim 11 further comprising:
   a) receiving notification of a state of the participant devices;
   b) storing the state of the participant devices;
   c) sending notification messages in response to the notification of state to others of the presentities;
   d) receiving an invitation to establish a media session with one of the participant devices;

e) determining an available one of the participant devices; and f) sending the invitation to establish the media session to the available one of the participant devices.

18. A communication system for providing distributed communication services comprising:
   a) a network interface; and
   b) a control system associated with the network interface and adapted to:
      i) subscribe to a plurality of presentities associated with participant devices to receive notification when the participant devices change state, the participant devices adapted to provide a communication service;
      ii) receive a subscribe request from the presentities to provide notification of a change in state;
      iii) determine the change in state; and
      iv) notify the presentities of the change in state.

19. The communication system of claim 18 wherein the control system is further adapted to receive notification of the change in state from one of the presentities.

20. The communication system of claim 18 wherein when determining the change in state, the control system is further adapted to:
   a) receive a communication control message from a remote device;
   b) take action in response to the communication control message; and
   when notifying the presentities of the change in state:
   c) send a notification message to the presentities identifying the change in state.

21. The communication system of claim 18 wherein when determining the change in state, the control system is further adapted to receive indication of an event occurrence and change state based on the event occurrence.

22. The communication system of claim 18 wherein communications with the presentities is based on a presence platform.

23. The communication system of claim 18 wherein the control system is further adapted to:
   a) receive an invitation to initiate a media session from a remote device wherein the invitation is sent to the participant devices; and
   b) send a notification to the presentities when the media session is accepted.

24. The communication system of claim 23 wherein the control system is further adapted to:
   a) receive a hold instruction to place the media session on hold; and
   b) send a notification message indicating the media session is held to other of the presentities.

25. The communication system of claim 24 wherein the control system is further adapted to:
   a) receive a notification message requesting transfer of the media session to a select one of the participant devices; and
   b) send a message to refer the media session to the select one of the participant devices.

26. The communication system of claim 25 wherein the notification message requesting transfer of the media session is received from a select one of the presentities.

27. The communication system of claim 25 wherein the media session is one of a voice or other media session.

28. A communication system for controlling distributed communication services in association with a plurality of participant devices comprising:
   a) a network interface; and
   b) a control system associated with the network interface and adapted to:
      i) receive subscribe requests from a plurality of presentities associated with participant devices to provide notification of a change in state;
      ii) determine the change in state;
      iii) notify the presentities of the change in state.

29. The communication system of claim 28 wherein the control system is further adapted to subscribe to the plurality of presentities to receive notification when the participant devices change state, the participant devices adapted to provide a communication service.

30. The communication system of claim 28 wherein the control system is further adapted to receive notification of the change in state from one of the presentities.

31. The communication system of claim 28 wherein when determining the change in state, the control system is further adapted to:
   a) receive a communication control message from a remote device; and
   b) take action in response to the communication control message; and
   c) when notifying the presentities of the change in state, send a notification message to the presentities identifying the change in state.

32. The communication system of claim 28 wherein the control system is further adapted to receive indication of an event occurrence and change state based on the event occurrence.

33. The communication system of claim 28 wherein communications with the participant devices is based on a presence platform.

34. The communication system of claim 28 wherein the control system is further adapted to:
   a) receive notification of a state of the participant devices;
   b) store the state of the participant devices;
   c) send notification messages in response to the notification of state to others of the presentities;
   d) receive an invitation to establish a media session with one of the participant devices;
   e) determine an available one of the participant devices; and
   f) send the invitation to establish a media session to the available one of the participant devices.

35. A method for providing distributed services on a presence platform comprising:
   a) providing a plurality of participant devices capable of providing a communication service;
   b) causing a plurality of presentities associated with the participant devices to subscribe to each other to receive notification of a change in state for the participant devices; and
   c) causing each of the presentities to notify each other of changes in state to effect a communication service.

* * * * *